United States Patent [19]
Novis et al.

[11] Patent Number: 5,867,795
[45] Date of Patent: Feb. 2, 1999

[54] PORTABLE ELECTRONIC DEVICE WITH TRANSCEIVER AND VISUAL IMAGE DISPLAY

[75] Inventors: Scott R. Novis, Tempe; William E. Carns, Forest Lakes; Karen E. Jachimowicz, Laveen, all of Ariz.

[73] Assignee: Motorola, Inc., Schaumburg, Ill.

[21] Appl. No.: 702,086

[22] Filed: Aug. 23, 1996

[51] Int. Cl.⁶ .................................................. H04M 11/00
[52] U.S. Cl. ......................... 455/566; 455/575; 455/550; 455/90
[58] Field of Search ........................... 455/550, 556–558, 455/95, 344, 346–347, 525, 90, 351, 349, 575, 566, 38.4; 348/115; 379/433, 428; H04M 11/00

[56] References Cited

U.S. PATENT DOCUMENTS

| | | | |
|---|---|---|---|
| 5,189,632 | 2/1993 | Paajanen et al. | 364/705.05 |
| 5,260,998 | 11/1993 | Takagi | 379/433 |
| 5,325,429 | 6/1994 | Kurgan | 379/429 |
| 5,457,751 | 10/1995 | Such | 348/115 |
| 5,491,507 | 2/1996 | Umezawa et al. | 348/14 |
| 5,606,594 | 2/1997 | Register et al. | 455/90 |
| 5,615,260 | 3/1997 | Kurgan | 379/433 |
| 5,711,013 | 1/1998 | Collet et al. | 455/558 |
| 5,719,936 | 2/1998 | Hillenmayer | 455/575 |

*Primary Examiner*—Richard Lee
*Assistant Examiner*—Vu Le
*Attorney, Agent, or Firm*—Rennie William Dover

[57] ABSTRACT

A portable electronic device (10) including a virtual image display (20) positioned within a housing (11) or a remote unit (30), capable of providing an image of information contained on a smart card (18) as well as transactions processed in response to data transmitted by a two-way voice transceiver (24) between a host database (118) and the portable electronic device (10). A sensor (19) constructed to have the smart card (18) positioned adjacent thereto in data sensing juxtaposition and electronics (22) connected to the sensor (19) for processing data between the host database (118) and the portable electronic device (10), and for reading and writing data to the smart card (18). The two-way voice communications transceiver (24) for transmitting and receiving data between the portable electronic device (10) and the host database (118), and the virtual image display (20) for supplying image data.

32 Claims, 4 Drawing Sheets

PORTABLE ELECTRONIC DEVICE WITH TRANSCEIVER AND VISUAL IMAGE DISPLAY

FIELD OF THE INVENTION

The present invention pertains, generally, to portable electronic devices and, more particularly, to a portable two-way voice transceiver device including a smart card interface and a visual image display.

BACKGROUND OF THE INVENTION

Portable two-way voice communications transceivers, such as cellular telephones are becoming increasingly popular. In addition to the ability to transmit audible information, in many instances it is desirable to provide a visual display on the communications transceiver to supply the operator with detailed visual text or graphical images that are being transmitted. Likewise, smart cards are also becoming increasingly popular around the world. It is estimated that in the near future ownership of at least one smart card, as well as a portable electronic device that allows the user to read and/or edit information contained on the smart card, will become commonplace.

Furthermore, with the advent of smart cards there is a desire to conduct greater and greater amounts of wireless commercial, financial and service related transactions utilizing smart card technology and the wireless infrastructure. More specifically, there is a great desire to perform secure transactions through wireless technology utilizing information stored on the card and a server database, such as a financial institution, hospital, mail-order company, or the like. Due to this rising popularity in portable electronic devices, there exist concerns over the ability and desire of users to carry numerous separate devices. The problem is that it is difficult and unwieldy to carry various portable electronic devices, e.g. cellular telephones, smart card reader, pagers, and other devices.

Generally a smart card is defined as a card (similar in size to a common credit card) containing a semiconductor chip with some electronics and a memory for storing information. Smart cards are used to store personal information, ranging from medical information to financial data, as well as the storage of monetary value. The large amount of information, or data, stored on a smart card is not generally accessible for editing, use, or viewing without the intervention of a smart card interface, that is capable of reading information contained on the smart card. Also, various different smart cards are presently in use, including those that operate at a variety of different voltages and those that can be accessed by electrical contacts, contactless cards, optically readable cards, magnetically readable cards, etc. It is desirable, therefore, to provide means whereby the owner and/or an authorized individual can view the stored information on the card to determine the status as well as providing means for the conducting of secure wireless two-way voice commercial, financial, and service related transactions, in addition to the utilization of the same apparatus as a conventional cellular transceiver device.

Accordingly, there exist a need to integrate a smart card interface, as well as a cellular transceiver, and a visual display into a portable electronic device, while maintaining portability and ease in carrying the device. This type of portable electronic device would allow the user to conduct numerous types of secure wireless commercial, financial and service related transactions utilizing the smart card and existing wireless technology.

It is a purpose of the present invention to provide new and improved apparatus including a two-way voice communications transceiver, a smart card interface and a visual image display.

It is yet another purpose of the present invention to provide for new and improved apparatus for viewing, editing and performing various types of wireless commercial, financial and service related transactions, utilizing smart card technology and wireless two-way voice transmissions.

It is still another purpose of the present invention to provide new and improved apparatus for viewing information stored on a smart card as well as performing transactions utilizing the smart card, which apparatus contains safe features to prevent unwarranted viewing and use of the information and the smart card.

It is a further purpose of the present invention to provide new and improved apparatus for conducting transactions utilizing a smart card and a two-way voice transceiver, which apparatus is additionally capable of operating as a conventional cellular telephone device.

It is a still further purpose of the present invention to provide new and improved apparatus including a two-way voice communications transceiver, a visual image display and a smart card interface which is portable, wireless and easy to operate.

SUMMARY OF THE INVENTION

The above problems and others are at least partially solved and the above purposes and others are realized in a portable electronic device including a visual image display, such as a virtual image display, positioned to provide an image for viewing at the viewing aperture, such as a viewing aperture formed integral a housing of the portable electronic device, or within a remote unit, such as a head-mounted visual display. The visual image display includes a data input terminal designed to receive image data thereon. A sensor structure is mounted in the housing and constructed to have a smart card with data stored thereon positioned adjacent thereto in data sensing juxtaposition. The sensor structure includes an input terminal for receiving data thereon and an output terminal having sensed data thereon. Electronics are mounted in the housing and connected to the input terminal and the output terminal of the sensor structure for receiving, processing and transmitting data between a host database and the smart card and are further connected to the input terminal of the visual image display for supplying image data thereto in response to the data. A two-way voice cellular transceiver device, such as a conventional cellular transceiver, is mounted in the housing and connected to the electronics for receiving and transmitting data between the electronics of the portable electronic device and the host database.

BRIEF DESCRIPTION OF THE DRAWINGS

Referring to the drawings.

DESCRIPTION OF THE PREFERRED EMBODIMENTS

Figure 1:
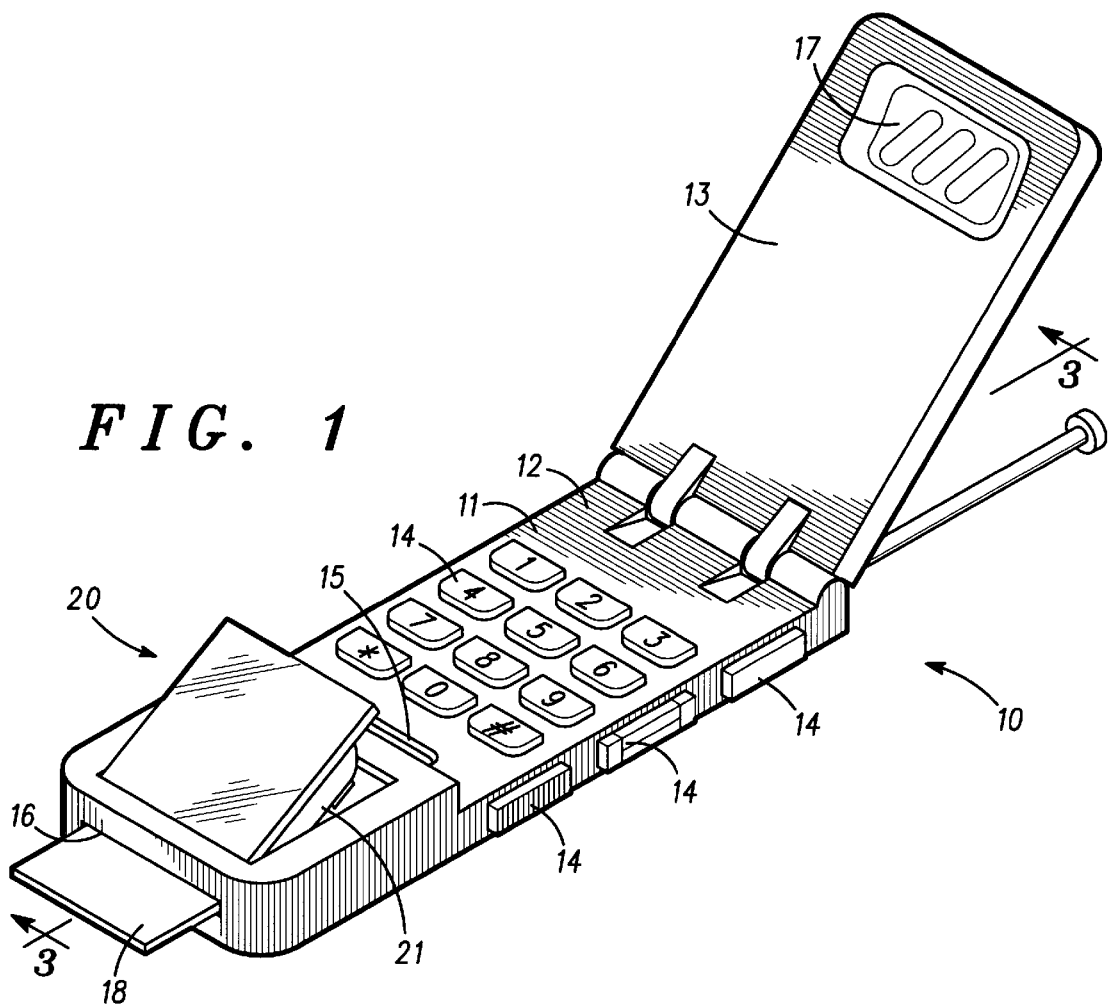
FIG. 1 is an isometric view of a first embodiment of a portable electronic device in accordance with the present invention.
Figure 2:
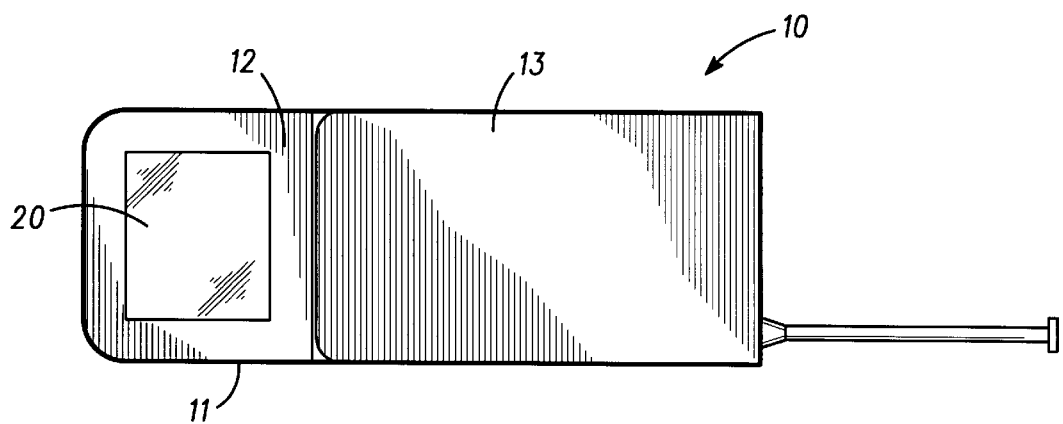
FIG. 2 is a top view of the device of FIG. 1, the miniature virtual display in a stored or non-use position.
Figure 3:
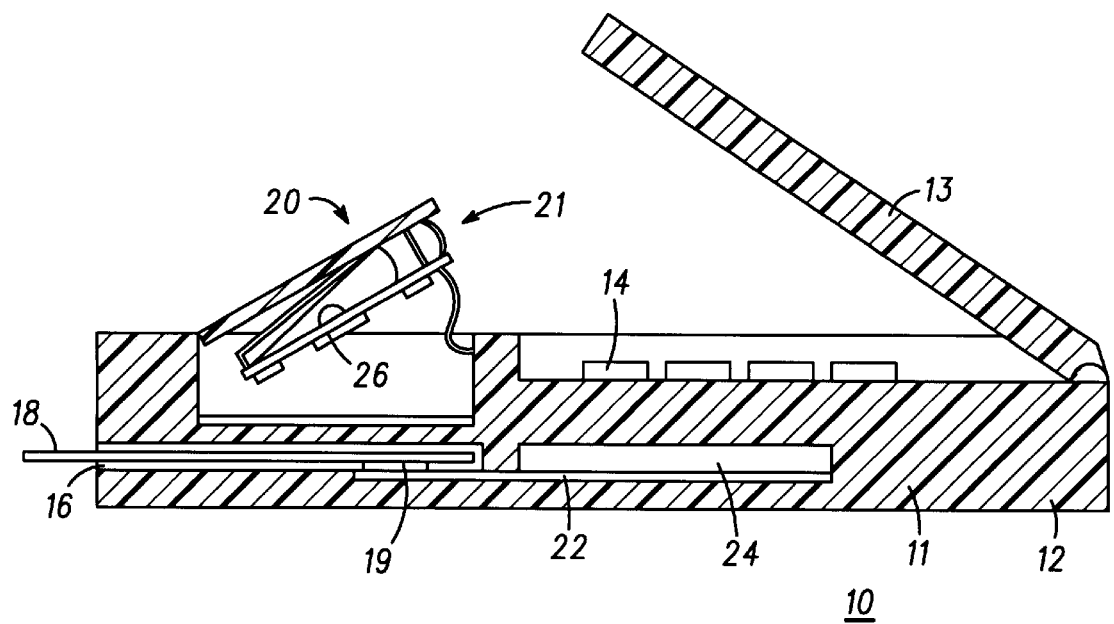
FIG. 3 is a simplified sectional view as seen along the line 3—3 of FIG. 1.

Turning now to the drawings, FIGS. 1, 2 and 3 illustrate a first embodiment of a portable electronic device 10 in accordance with the present invention. Portable electronic device 10 includes a portable housing 11 which is ergonomically designed to be handheld, that is housing 11 is formed to conveniently fit the hand and allow comfortable use of a plurality of user controls 14 to operate the device. As illustrated, housing 11 is composed of a base component 12 and a hingedly attached flipper component 13, that when in a non-use or stored position rests upon an uppermost surface of base component 12 and serves to protect user controls 14. There is positioned within base component 12 a microphone 15 and within hingedly attached flipper component 13 a speaker 17. Housing 11 also includes a slot 16 for receiving a smart card 18 therein and allowing the sensing of information stored on smart card 18. Slot 16 is designed to place smart card 18 adjacent to a sensor structure 19 (illustrated in FIG. 3) mounted in housing 11 in data sensing juxtaposition. It will of course be understood that while slot 16 is preferable for correctly positioning smart card 18, other structures might be utilized, including simply placing smart card 18 adjacent to a sensor structure that is externally accessible.

Housing 11 also has a visual display 20 (discussed presently) mounted therein for providing a visual image of the information stored on smart card 18 and information pertaining to transactions performed utilizing portable electronic device 10 and communications with a host database (discussed presently). As illustrated, visual display 20 is operational in a "pop-out" position, allowing for viewing of a generated image by the user of portable electronic device 10. Visual display 20, as illustrated in FIG. 2, is retractable into housing 11 when the user is utilizing portable electronic device 10 solely as a conventional cellular telephone or when portable electronic device 10 is not in use.

Electronics 22 are mounted in housing 11 in electrical communication with sensor structure 19 and a two-way voice communications transceiver 24, more specifically a two-way voice cellular communications transceiver, which in this specific embodiment are illustrated as being mounted directly on a circuit board containing and interconnecting electronics 22, sensor structure 19, and two-way voice communications transceiver 24. The circuit board containing electronics 22 is also positioned to have interfaced therewith and electrically connected to electronics 22, image generating apparatus 26 including a two dimensional array of light emitting devices connected to provide a complete image in visual display 20. Generally, electronics 22 include a central processing unit (CPU) and memory (RAM or ROM) capable of working with the CPU and visual display 20.

In a preferred embodiment, sensor structure 19 is constructed to physically engage external electrical contacts on smart card 18 so that smart card 18 is directly connected to the CPU in electronics 22. The CPU is programmed to interface with the memory and circuitry on smart card 18 and provide the information stored on smart card 18 to visual display 20 in the form of image data. Visual display 20 then generates an image (or images) of the sensed data from smart card 18. It should be understood that the insertion of smart card 18 into slot 16 activates visual image display 20 thus positioning display 20 in a "pop-out" position. It should further be understood that visual image display 20 in a different mode is operational by the user to receive transmitted data to portable electronic device 10 without the necessity of smart card 18.

It is disclosed that sensor structure 19 can include optical sensors, capable of sensing optically stored information, magnetic sensors, capable of sensing magnetically stored information, and/or electronic sensors, capable of sensing electronically stored information, in addition to or instead of physically engaging electrical contacts. In addition, the CPU in electronics 22 is programmed to interface with two-way voice communications transceiver 24 and provide for transmissions to and from portable electronic device 10, thus sensor structure 19 is constructed to communicate information to smart card 18 from the CPU, as well as communicating information from smart card 18 to the CPU.

Figure 4:
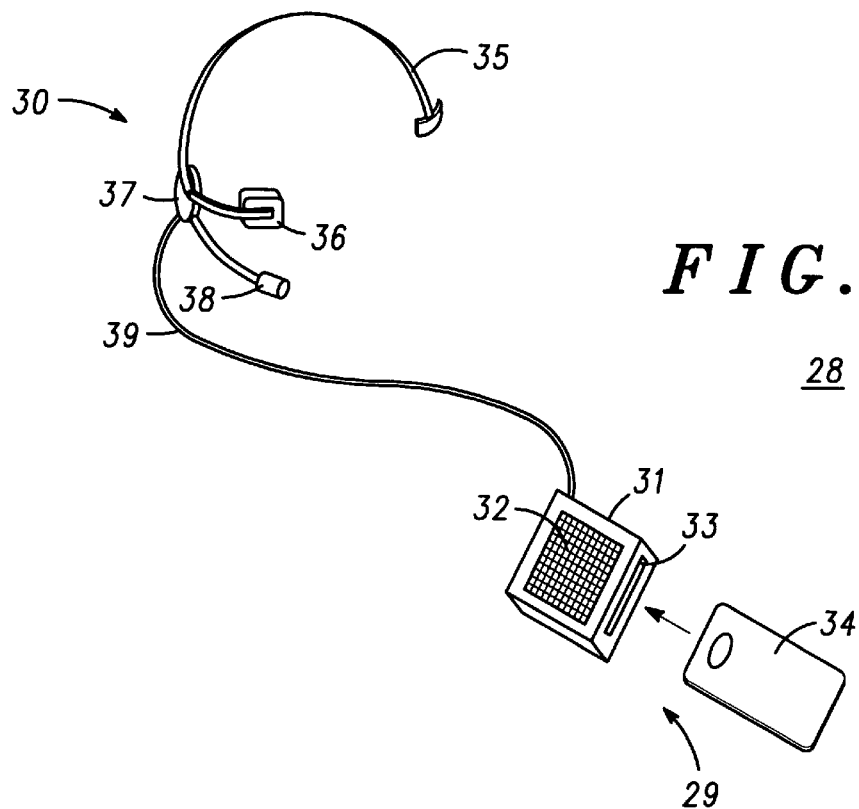
FIG. 4 is an isometric view of a second embodiment of a portable electronic device in accordance with the present invention.

Referring now to FIG. 4, illustrated in simplified isometric view is a second embodiment of a portable electronic device 28 according to the present invention. Portable electronic device 28 is composed of a base component 29 and a remote unit 30. Portable electronic device 28, more specifically base component 29, includes a portable housing 31 which is ergonomically designed to be attached to a user, such as by clipping and/or fastening base component 29 to the clothing/belt of the user. Housing 11 is formed to conveniently allow use of a plurality of user controls (not shown) to operate the device. There is positioned within base component 29 a speaker 32, thus allowing for authorized listeners to hear audible information. It should be understood that there is provided means for the user to power OFF this speaker, thus providing a higher degree of security. Housing 31 also includes a smart card interface 33, more specifically a slot for receiving a smart card 34 therein and allowing the sensing of information stored on smart card 34. Slot 33 is designed to place smart card 34 adjacent to a sensor structure (generally similar to sensor structure 19 of FIGS. 1–3) mounted in housing 31 in data sensing juxtaposition. It will of course be understood that while slot 33 is preferable for correctly positioning smart card 34, other structures might be utilized as previously detailed with regard to FIGS. 1–3.

Remote unit 30 is illustrated in this embodiment as a head-mount unit 35 having electrically interfaced a visual image display 36, such as a miniature virtual image display, which can be in the form of a heads-up display, for providing a visual image of the information stored on smart card 34 and information pertaining to transactions performed utilizing portable electronic device 28 and communications with a host database (discussed presently). As illustrated, head-mount unit 35 is electrically interfaced with base component 29 using a wired interface 39. It should be understood that remote unit 30 and base component 29 alternatively, are interfaced using wireless technology, such as a radio frequency, infra-red, or similar wireless interface. There is provided integrally formed with head-mount unit 35 a earpiece speaker 37 and a microphone 38.

Electronics (generally similar to electronics 22 of FIGS. 1–3) are mounted in housing 31 in electrical communication with the sensor structure and a two-way voice communications transceiver (generally similar to communications transceiver 24 of FIGS. 1–3), more specifically a two-way voice cellular transceiver. There is provided an image generating apparatus (not shown) including a two dimensional array of light emitting devices connected to provide a complete image in visual image display 36. Similar to the first disclosed embodiment, the electronics housed within housing 31 include a central processing unit (CPU) and memory (RAM or ROM) capable of working with the CPU and visual image display 36.

As in the first preferred embodiment, the sensor structure is constructed to physically engage external electrical contacts on smart card 34 so that smart card 34 is directly connected to the CPU in the electronics. The CPU is similarly programmed as described with regard to the first embodiment to provide an image in display 36.

During operation of portable electronic devices 10 and 28, more specifically the conducting of transactions with a host database, portable electronic devices 10 and 28 use cryptological calculations, making data transmissions secure. To commence operation of either portable electronic device 10 or 28 the user enters security information, such as a PIN code, which could be input as a series of unique numbers or letters in visual display 20 or 36 using controls 14, or as a biometric identifier, such as a finger print or retinal scan. It is additionally anticipated by this disclosure that there may exist the need for the insertion of dual smart cards, thus providing a higher level of security. Additional information regarding a smart card device that operates based on a dual card security system can be found in currently pending U.S. patent application, entitled "DUAL CARD SMART CARD READER WITH VISUAL IMAGE DISPLAY", Ser. No. 08/672,002, filed Jun. 24, 1996, assigned to the same assignee and incorporated herein by this reference. Display elements 20 and 36 when fabricated as a high resolution touch sensitive panels, are capable of not only displaying data but also acting as the biometric input device for more secure applications. When utilizing devices 10 and 28 in a typical service related transaction, such as a medical emergency with device 10 or 28 being utilized by emergency medical technicians, the CPU would first process the security information, and once accepted, using two-way voice communications transceiver 24, transmit information, dependent upon user input, text or audible, to a host database, such as a emergency hospital. It is anticipated, that in an emergency medical situation, a smart card, containing medical history of the individual receiving emergency care, is positioned within slot 16 or 33 of device 10 or 28. This information once received by the host database is verified and processed by the host database, transmitting confirmation such as prescribed medications, back to portable electronic device 10 or 28, regarding emergency care, which information is subsequently recorded on smart card 18 or 34 and provides a visual image thereof visible in display 20 and 36. In addition, emergency medical technicians can audibly converse with hospital personnel utilizing the same two-way voice communications transceiver 24 and the speaker/microphone 15, and 17 of device 10 or speaker/microphone 32, 37, and 38 of device 28.

There is provided as a part of electronics 22 a central processing unit (CPU), such as a portable consumer computer device, which serves as the heart of the system. The transmission of information from portable electronic device 10 or 28 to the host database utilizes wireless technology, more specifically two-way voice communications transceiver 24, such as a conventional cellular device, capable of transmitting and receiving the information utilized during the transaction.

It should be understood that use of portable electronic device 10 or 28 as a conventional cellular telephone device is anticipated by this disclosure. To this end, controls 14 allow the user to choose the mode of operation of device 10 or 28, more specifically choosing between a smart card reader/transmission mode or a conventional cellular telephone mode. Alternatively, portable electronic devices 10 and 28 are programmed to permit use as a conventional cellular telephone as a default when a smart card, such as smart card 18 or 34, is not physically engaged in slot 16 or 33.

During operation in a smart card reader/transmission mode, portable electronic devices 10 and 28 are capable of conducting other types of transactions, such as secure wireless financial transactions. More specifically, operation of portable electronic device 10 or 28 for the addition of monetary value to value holding smart cards, as well as the purchase, thus subsequent debit from a value card, credit card, or the like, such as for the purchase of catalog sales merchandise, are anticipated by this disclosure. In a typical scenario utilizing portable electronic device 10 in a commercial purchasing transaction, the user would be able to receive and preview specially formatted graphical advertisements within display 20, such as for the purchase of a specific consumer good. The user would conduct a transaction for the purchase of the goods by transferring money from an inserted stored value card or credit card. Security regarding account numbers is increased through cryptographic calculations, thereby remedying the interception of audibly read account numbers over telephone lines. In addition, this type of talk and view capability allows the user to view information encoded on the card, or information exchanged over the airwaves using digital or analog protocols to simultaneously exchange the data and messages. Ultimately, the purchase information would be transmitted from the host database and stored on smart card 18. Thus the combination of two-way voice communications transceiver 24 to portable electronic device 10 makes it possible to access a wide variety of interactive graphical consumer data.

Figure 5:
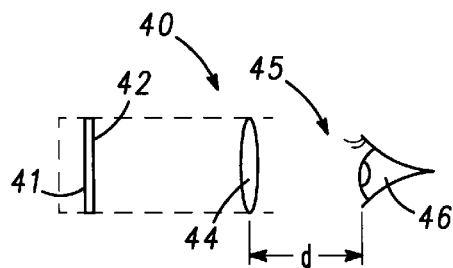
FIG. 5 is a simplified schematic view of a portion of the virtual image display for the portable electronic device of FIG. 1.

Referring specifically to FIG. 5, an example of visual displays 20 and 36 is illustrated in a simplified schematic view, designated 40. Display 40 includes apparatus 41 for providing an image on a surface 42. An optical system, represented by lens 44, is positioned in spaced relation to surface 42 of apparatus 41 and produces a virtual image viewable by an eye 46 spaced from an aperture 45 defined by lens 44.

Figure 6:
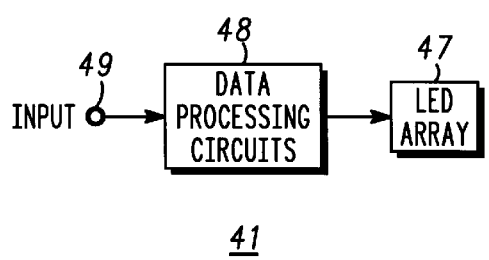
FIG. 6 is a simplified block diagram of a portion of a virtual image display for the portable electronic device of FIG. 1.

Apparatus 41 is illustrated in more detail in FIG. 6 and includes, for example, semiconductor electronics such as a light emitting device (LED) array 47 driven by data processing circuits 48. Data processing circuits 48 include, for example, logic and switching circuit arrays for controlling each LED in LED array 47. Data processing circuits 48 include, in addition to or instead of the logic and switching arrays, a microprocessor or similar circuitry for processing input signals of software instructions to produce a desired image on a device such as LED array 47. It will be understood that data processing circuits 48 and LED array 47, while illustrated separately for purposes of this description, could be formed on the same semiconductor chip in some applications.

In this specific embodiment LED array 47 includes light emitting diodes which are utilized because of the extremely small size that can be achieved and because of the simplicity of construction and operation. It will of course be understood that other image generating devices may be utilized, including but not limited to lasers (such as vertical cavity surface emitting lasers), liquid crystal devices, organic light emitting diodes, field emission devices, electroluminescent displays, direct retinal scan displays, etc.

Figure 7:
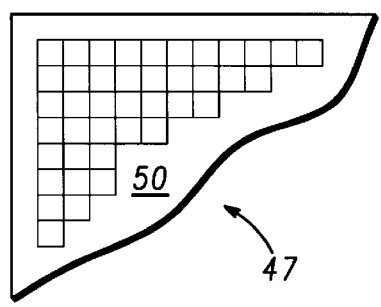
FIG. 7 is a view in top plan of a portion of the apparatus of FIG. 6.

Referring specifically to FIG. 7, a plan view of LED array 47 is illustrated in which the LEDs are formed in a regular pattern of rows and columns on a single substrate 50, which in this embodiment is a semiconductor chip. Portions of substrate 50 are broken away to simplify the drawing but it should be understood that many of the other circuits, and especially drivers, could be included on the same substrate. By addressing specific LEDs by row and column in a well known manner, the specific LEDs are energized to produce an image or images. Digital or analog data is received at input terminal 49 and converted by data processing circuits 48 into signals capable of energizing selected LEDs to generate the predetermined image.

It will be understood by those skilled in the art that LED array 47 and substrate 50 are greatly enlarged in the figures. The actual size of substrate 50 is on the order of a few milli-meters along each side, with the light emitting area or array being generally in the range of 2 to 50 millimeters and preferably 5 to 10 milli-meters, with each LED being less than 20 microns on each side and preferably on the order of as little as one micron on a side. It should be understood that the actual light emitting device array is much smaller, because bonding pads, etc. add several millimeters of area on each side. Generally, the larger size substrates or chips simply mean that more light emitting devices are used in the array to provide more definition, color, etc.

The lens system, represented schematically by lens 44, is mounted in spaced relation from surface 42 of apparatus 41 so as to receive the image from surface 42, magnify it a predetermined amount and create the aperture within which the virtual image is viewed. In the present embodiment, lens 44 magnifies the image fifteen times (15×) so that the image from LED array 47 is magnified fifteen times its original angular size. Generally, a magnification of at least ten is required to magnify the image sufficiently to be perceived by a human eye. It will of course be understood that the lens system may be adjustable for focus and additional magnification, if desired, or may be fixed in housing 11 or 31 or for simplicity.

Figure 8:
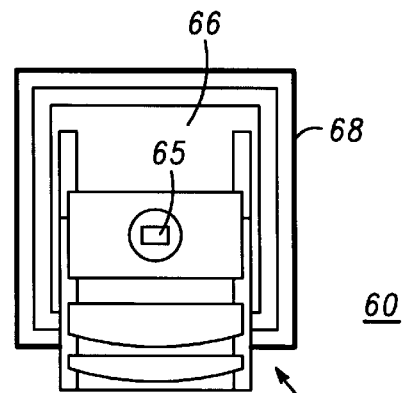
FIGS. 8, 9 and 10 are top, front, and side views of a portion of a virtual image display for the portable electronic device of FIG. 1.
Figure 9:
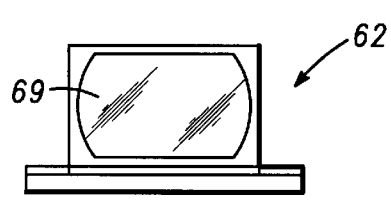
Figure 10:
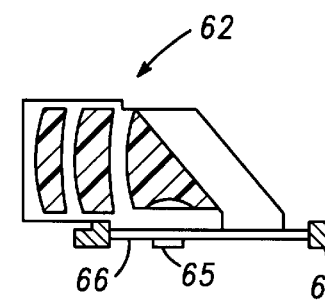

FIGS. 8, 9 and 10 illustrate a top plan view, front view, and side elevation, respectively, of a miniature virtual image display 60 which, in a preferred embodiment, is used as visual display 20 in portable electronic device 10 and visual display 36 in portable electronic device 28. Miniature virtual image display 60 incorporates a single fold optical magnifier 62. FIGS. 8, 9 and 10 illustrate miniature virtual image display 60 approximately the actual size to provide some indication as to the extent of the reduction in size achieved by the apparatus. Display 60 includes image generating apparatus 65 with an array of light emitting devices, such as organic or inorganic light emitting diodes, field emission devices, vertical cavity surface emitting lasers, liquid crystal devices, etc. In this specific embodiment, image generating apparatus 65 includes an array of light emitting devices, more specifically an array containing 240 columns and 144 rows of light emitting devices. Each light emitting device is fabricated approximately 20 microns on a side with a center-to-center spacing between adjacent devices of no more than 20 microns. Each light emitting device is turned ON with approximately 1.8 volts and utilizes approximately 50 $\mu$A of current when it is turned ON. Apparatus 65 produces a luminance less than approximately 15 fL.

Apparatus 65 is mounted on the under-surface of a glass substrate 66 and a driver board 68 is bump-bonded to substrate 66. Additional information on driver boards and bonding of substrates to the driver boards is disclosed in U.S. Pat. No. 5,432,358, entitled "INTEGRATED ELECTRO-OPTICAL PACKAGE", issued Jul. 11, 1995 and assigned to the same assignee, which information is included herein by reference.

Single fold optical magnifier 62 is also mounted on substrate 66 and includes a plurality of optical elements defining a light path from apparatus 65 to a viewing aperture 69, best seen in FIG. 9. The plurality of optical elements are constructed to angularly magnify images, generated by apparatus 65, at a light inlet of a first optical element by greater than ten. Because of the length of the optical path and the size of apparatus 65 (the image source), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 11:
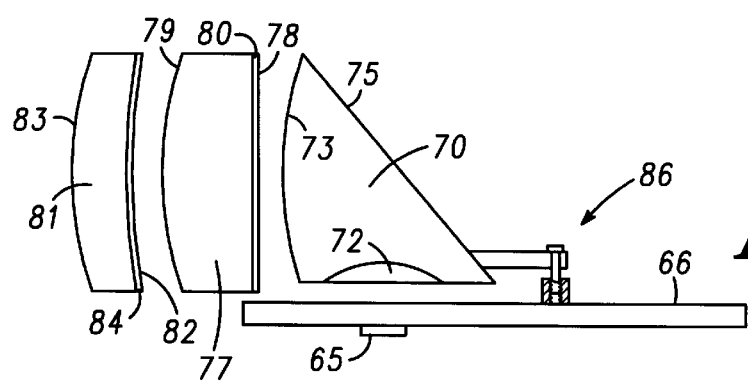
FIG. 11 is an enlarged side view of the apparatus of FIG. 8.

Referring specifically to FIG. 11, a 4× magnified view in side elevation of portions of display 60 of FIG. 8 is illustrated for clarity. From this view it can be seen that the plurality of optical elements includes a first optical element 70 having a field flattening light inlet 72, a spheric surface serving as a light outlet 73 and directed at an angle to field flattening light inlet 72 and a reflecting surface 75 optically positioned between field flattening light inlet 72 and light outlet 73 so as to direct light from field flattening light inlet 72 to light outlet 73. In this specific embodiment, element 70 is formed as a prism and is molded from an optical quality plastic. Generally, it is understood that optical quality plastic is material having a high index of refraction, between approximately 1.5 and 1.6. Reflecting surface 75 may be a separate silvered mirror that is simply molded into first optical element 70, or reflecting surface 75 can be silvered after formation of first optical element 70, or reflecting surface 75 can be uncoated and used in a total internal reflection mode.

In this embodiment, field flattening light inlet 72 takes the form of an aspheric field flattening concave surface molded directly into first optical element 70 and formed as an integral part thereof. It will be understood, however, that field flattening light inlet 72 could be formed as a separate lens and subsequently positioned in optical alignment with the lower surface of first optical element 70. Separate components of course result in additional components and assembly steps which can increase the cost and size of the final structure.

Reflecting surface 75 is disposed, with respect to field flattening light inlet 72 and light outlet 73, to fold or bend light passing through first optical element 70 at an angle between approximately 80° to 100°. More specifically, in the embodiment illustrated, light is reflected at an angle of approximately 95°. It has been found, for example, that an angle of 95° avoids vignetting on the lower part of the image at the outlet of single fold optical magnifier 62.

A significant part of the design of miniature virtual image display 60 is the use of a solid, single fold prism with a convex outlet face to enable increased angular magnification (reduced effective focal length) in the same volume of space compared to the use of a simple turning mirror in the air.

The plurality of optical elements further includes an optical lens 77 having a light inlet 78, positioned adjacent light outlet 73 of first optical element 70, and a light outlet 79. In the specific embodiment illustrated, optical lens 77 is a biaspheric optical lens having an aspheric surface defining light inlet 78 and an aspheric surface defining light outlet 79. Optical lens 77 is fixedly mounted relative to first optical element 70 by any convenient means including an outer housing (illustrated schematically in FIGS. 8–10), a mounting frame, or any other convenient structure. The aspheric surfaces, including light outlet 79 and light inlet 78 of optical lens 77 and light outlet 73 and field flattening light inlet 72 of first optical element 70 are designed to reduce and/or eliminate any aberration in wavefront as it passes from field flattening light inlet 72 to light outlet 79 of optical lens 77.

The plurality of optical elements, including first optical element 70 and optical lens 77, define a light path from field flattening light inlet 72 of first optical element 70 to light outlet 79 of optical lens 77. To fabricate a single fold optical magnifier that is useful in portable electronic devices, the total average optical length of the optical path should be in the range of approximately 15 to 35 millimeters. In this embodiment the optical path from field flattening light inlet 72 to the aspheric surface defining light outlet 79 of optical lens 77 is approximately 20 millimeters.

Also, the plurality of optical elements, including first optical element 70 and optical lens 77, are constructed to include at least one diffractive optical element positioned in the light path so as to provide additional, primarily chromatic (in this embodiment), aberration correction. In the embodiment illustrated, a diffractive optical element 80 is incorporated into the aspheric surface defining light inlet 78 of optical lens 77. It will of course be understood that diffractive optical elements can, instead of, or in addition to diffractive optical element 80, be included in any other surface of the plurality of elements in miniature virtual image display 60. If a diffractive optical element is included in a surface that is substantially normal to the light path, as opposed to those in which the light strikes the surface at an angle, the diffractive optical element is somewhat easier to construct because of rotational symmetry, whereas surfaces on which light strikes at an angle have nonrotational symmetry. Because the aspheric surfaces and diffractive optical element 80 make optical lens 77 relatively complex, it has been found that fabrication of optical lens 77 is best done by injection molding.

While first optical element 70 and optical lens 77 can be constructed to form a complete magnifier, in this specific embodiment, a low power optical lens 81 is included as an example of possible extensions of the magnifier. Low power optical lens 81 includes a spheric surface which defines a light input 82 and a spheric surface which defines a light output 83. A diffractive optical element 84 is formed in the inlet surface of low power optical lens 81 to provide additional aberration correction. Low power optical lens 81 is mounted adjacent optical lens 77 and forms an outlet optical element that defines an aperture through which the angularly magnified image can be viewed. The addition of low power optical lens 81 may add somewhat to the size and complexity of miniature virtual image display 60, but provides some angular magnification and aberration correction that reduces the complexity of the various other elements, which can in many applications reduce the overall cost of display 60. Because of its low power, optical lens 81 may also be used as the package window, or viewing aperture. In applications in which only first optical element 70 and optical lens 77 are utilized, it may be convenient to define the viewing aperture with a glass or plastic window, which may be clear, a light filter, etc.

In many applications it may be desirable to include apparatus for focusing the final image. To this end, first optical element 70 (and other elements 77 and 81, if desired) is mounted on substrate 66 by means of a threaded adjustment 86 which can be rotated by a thumb screw, screwdriver, etc., to move the fixed assembly of elements 70, 77 and 81 vertically toward and away from substrate 66 and apparatus 65. Focusing is accomplished by simply changing the distance between field flattening light inlet 72 and the image generated on apparatus 65.

Figure 12:
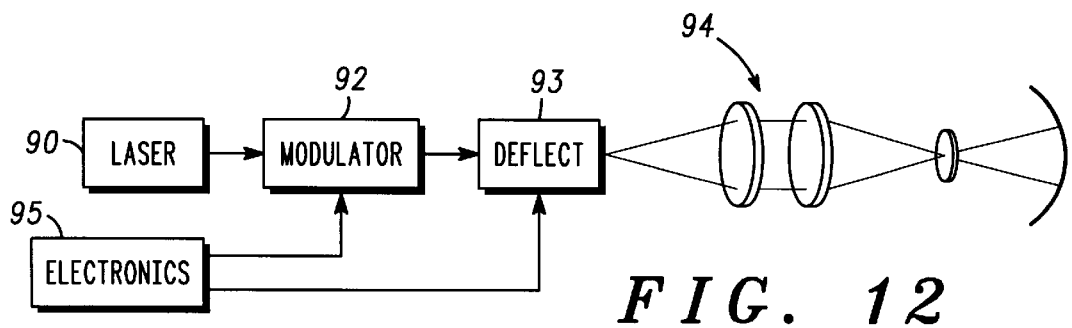
FIG. 12 is a block diagram of another visual display for the portable electronic device of FIG. 1.

FIG. 12 is a block diagram of a direct retinal scan display, which might also be utilized as visual display 20 and 36 of portable electronic device 10 and 28, respectively. A laser 90, which may be any of the well known lasers including solid state lasers, such as vertical cavity surface emitting lasers, diode lasers, diode-pumped lasers, etc., supplies a coherent light beam to a modulator 92. Modulator 92 impresses video information onto the light beam generally by modulating the intensity of the light beam as, for example, by providing changes in the power level of laser 90. Depending upon the application, the modulation could be as simple as turning laser 90 off and on, which essentially translates into a digital system. Acousto-optic modulators are one of the preferred modulators for most applications, but other techniques, such as electro-optics and mechanical are completely feasible.

The modulated light beam from modulator 92 is directed to a deflection system 93. A lens system 94 is used to focus the light beam from deflection system 93 into an eye. The focal length of lens system 94 is chosen so that the scanning system focal point is within the pupil of the eye and the coherent beam focal point is at the retina of the eye.

Timing and control of modulator 92 and deflection system 93 is provided by electronics 95. Electronics 95 includes a basic oscillator, or timer, which provides the timing signals to cause the sweeping and modulating to occur at the proper times. Also, electronics 95 provides video signals to modulator 92 to modulate the light beam to the correct intensity at the required times. Further, electronics 95 provides horizontal and vertical (orthogonal) deflection signals to cause deflection system 93 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

The purpose of deflection system 93 is to scan the modulated light beam on the retina of the eye, or "write" an image on the retina. There are many possible configurations for deflection system 93 and lens system 94, depending upon the application of the display and how it is desired to form the image in the eye. Additional information on this type of display is available in a copending U.S. patent application entitled "DIRECT RETINAL SCAN DISPLAY", Ser. No. 08/292,193, filed Aug. 18, 1994, assigned to the same assignee, which is a file wrapper continuation of U.S. patent application entitled "DIRECT RETINAL SCAN DISPLAY", Ser. No. 07/857,193, filed Mar. 24, 1992. While the direct retinal scan display does not technically generate a virtual image, the direct retinal scan display is included in the definition of a virtual display apparatus for purposes of this disclosure because of the similarity thereto.

It is anticipated by this disclosure, that dependent upon the use requirements of devices 10 and 28, there may be included within housing 11 and 31s a direct view display (not shown) for the viewing of a direct view image, such as in the instance where devices 10 and 28 are being utilized simply as a conventional cellular telephone device.

Figure 13:
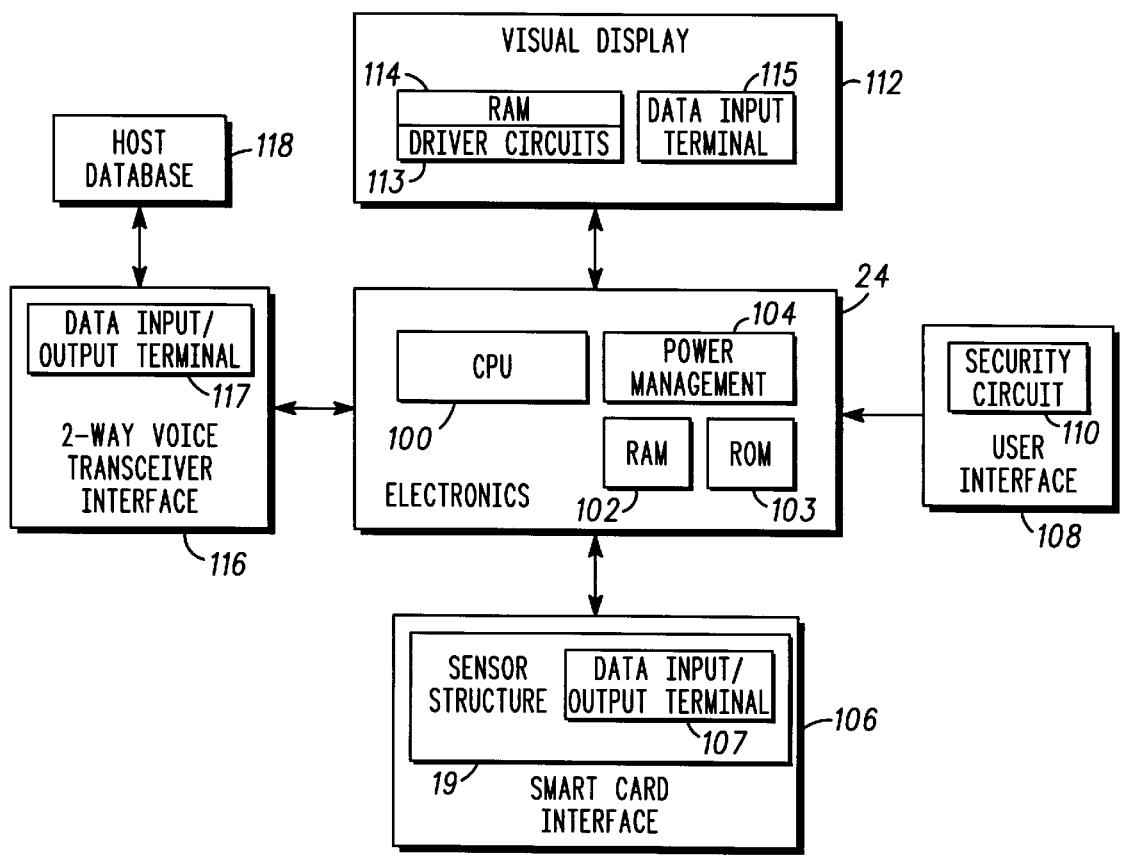
FIG. 13 is a block diagram of the portable electronic device of FIG. 1.

Turning now to FIG. 13, a simplified block diagram of portable electronic device 10 or 28 is illustrated. In this specific embodiment, a central processor unit (CPU) 100 is illustrated as being a part of electronics 22, using a random access memory (RAM) 102 and a read only memory (ROM) 103. In this preferred embodiment an MC68HC05SC21 available commercially from MOTOROLA, INC. is utilized as CPU 100. It will of course be understood that RAM 102 and ROM 103 can be internal to CPU 100 and/or external memories can be provided for additional or specialized features. A power management circuit 104 is provided to accommodate different smart cards with different power and/or different voltage requirements (e.g. voltages in a range of 1 to 12 volts).

A smart card interface 106 is used to couple the smart card to CPU 100 and, as described previously, may include any or all of electrical contacts for direct physical connection, optical readers, magnetic sensors, electronic sensors (e.g. infrared sensors, RF sensors, etc. for contactless cards). In this embodiment, card interface 106 includes sensor structure 19 (FIG. 3) including data input and output terminals 107.

A user interface 108 is provided to allow the user to communicate with CPU 100 and, ultimately, the smart card. User interface 108 includes various buttons and controls for operating visual displays 20 and 36. Generally, user interface 108 includes at least an OFF/ON control and means, such as a cursor for pull-down menus, advance/reverse images, etc., to control the views being generated by visual displays 20 and 36. Associated with user interface 108 is a security circuit 110 which generally will allow operation of portable electronic devices 10 and 28 only in response to some secret information known only to the smart card owner, e.g. a PIN number, biometric input, some internal circuit that matches an internal circuit of the smart card, etc. as well as the completion of specific transactions in response to verification of security information by the host database. To this end, user interface 108 may include one or more buttons (generally similar to controls 14 of FIG. 1) which must be properly operated by the user to activate portable electronic devices 10 and 28.

A visual display 112 includes an array of light emitting devices coupled to driver circuits 113, RAM 114 for storing and/or correctly orienting image data supplied by CPU 100 and data input terminal 115. Generally, visual display 112 can be any of the displays described above and preferably is miniature virtual image display 60 (FIGS. 8–10). As described above, visual display 112 can also include an LCD array such as that described in U. S. Pat. No. 5,486,946, entitled "INTEGRATED ELECTRO-OPTIC PACKAGE FOR REFLECTIVE SPATIAL LIGHT MODULATORS", issued Jan. 23, 1996 and assigned to the same assignee. Also, some typical electronics for generating an image on an array of light emitting devices is described in U. S. Pat. No. 5,432,358, entitled "INTEGRATED ELECTRO-OPTICAL PACKAGE", issued Jul. 11, 1995 and assigned to the same assignee. A two-way voice cellular communications transceiver 116, such as a conventional cellular telephone device, or the like, including a data input/output terminal 117, communicates with a host database 118 to transact business between portable electronic devices 10 and 28 and the host database 118.

Thus, new and improved apparatus for viewing information and conducting specific transactions utilizing a smart card, a cellular telephone and a visual image display is disclosed. The new and improved apparatus can be standardized to receive virtually any of the multiple types of smart cards and contains safe features to prevent unwarranted viewing of the information. Also, the new and improved apparatus is portable and easy to operate so that each smart card owner can easily carry an apparatus with them, if they desire, or have one at home or the office for instant apprisal of information stored on the smart card as well as the conduction of secure wireless commercial, financial and service related transactions utilizing the portable electronic device.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A portable electronic device comprising:
    a smart card interface including a sensor structure mounted in a portable housing and constructed to have a smart card having data stored thereon positioned adjacent thereto in data sensing juxtaposition, the sensor structure including an input terminal and an output terminal for reading and writing data to the smart card;
    a visual image display positioned to provide an image for viewing at a viewing aperture, the visual image display including a data input terminal designed to receive image data thereon, the visual image display further including a plurality of optical elements including at least one of a diffractive optical element positioned in a light path so as to provide aberration correction, the plurality of optical elements constructed to angularly magnify an image source at a light inlet of a first optical element;
    electronics mounted in the portable housing and connected to the input terminal and the output terminal of the sensor structure for receiving, processing and transmitting data between a host database and the portable electronic device and further connected to the input terminal of the visual image display for supplying image data thereto in response to the data; and
    a two-way voice communications transceiver mounted in the portable housing and connected to the electronics for receiving and transmitting data between the electronics of the portable electronic device and the host database.

2. A portable electronic device as claimed in claim 1 wherein the visual image display positioned to provide an image for viewing at a viewing aperture is mounted within the portable housing of the portable electronic device.

3. A portable electronic device as claimed in claim 2 further including a speaker and a microphone mounted in the portable housing of the portable electronic device.

4. A portable electronic device as claimed in claim 1 wherein the visual image display positioned to provide an image for viewing at a viewing aperture is mounted within a remote unit.

5. A portable electronic device as claimed in claim 4 wherein the remote unit is a head-mount unit.

6. A portable electronic device as claimed in claim 5 wherein the head-mount unit includes a microphone and an earpiece speaker.

7. A portable electronic device as claimed in claim 4 wherein the remote unit includes one of wired, wireless, radio frequency and infra-red communication capabilities with the electronics of the portable electronic device.

8. A portable electronic device as claimed in claim 1 wherein the visual image display is a virtual image display.

9. A portable electronic device as claimed in claim 8 wherein the virtual image display includes a two dimensional array of light emitting devices connected to provide a complete image, the two dimensional array being coupled to the data input terminal of the virtual image display for receiving the image data and generating the image in response thereto.

10. A portable electronic device as claimed in claim 9 wherein the two dimensional array of light emitting devices includes a two dimensional array of light emitting diodes.

11. A portable electronic device as claimed in claim 10 wherein the two dimensional array of light emitting devices includes a two dimensional array of organic light emitting diodes.

12. A portable electronic device as claimed in claim 10 wherein the two dimensional array of light emitting devices includes a two dimensional array of liquid crystal devices.

13. A portable electronic device as claimed in claim 1 wherein the electronics includes a central processing unit (CPU) and a random access memory (RAM).

14. A portable electronic device as claimed in claim 1 wherein the two-way voice communications transceiver is a conventional cellular transceiver device.

15. A portable electronic device comprising:
   a portable housing;
   a virtual image display positioned to provide an image for viewing at a viewing aperture, the virtual image display including a data input terminal designed to receive image data thereon, the virtual image display further including a two dimensional array of light emitting devices connected to provide a complete image, the two dimensional array being coupled to the data input terminal of the virtual image display for receiving the image data and generating the image in response thereto, the virtual image display further including a plurality of optical elements including at least one of a diffractive optical element positioned in a light path so as to provide aberration correction, the plurality of optical elements constructed to angularly magnify an image source at a light inlet of a first optical element;
   a sensor structure mounted in the portable housing and constructed to have a smart card having data stored thereon positioned adjacent thereto in data sensing juxtaposition, the sensor structure including an input terminal for receiving transmitted data thereon and an output terminal having sensed data thereon;
   a two-way voice cellular communications transceiver mounted in the portable housing and including an input terminal for receiving data from the sensor structure and an output terminal having data transmitted from a host database thereon; and
   electronics mounted in the portable housing and connected to the input terminal of the sensor structure for receiving the transmitted data from the host database and the output terminal of the sensor structure for receiving the sensed data from the smart card and further connected to the input terminal of the virtual image display for supplying image data thereto.

16. A portable electronic device as claimed in claim 15 wherein the two dimensional array of light emitting devices includes a two dimensional array of light emitting diodes.

17. A portable electronic device as claimed in claim 16 wherein the two dimensional array of light emitting devices includes a two dimensional array of organic light emitting diodes.

18. A portable electronic device as claimed in claim 17 wherein the two dimensional array of light emitting devices includes a two dimensional array of liquid crystal devices.

19. A portable electronic device as claimed in claim 15 wherein the electronics includes a central processing unit (CPU) and a random access memory (RAM).

20. A portable electronic device as claimed in claim 15 wherein the virtual image display is mounted within the portable housing.

21. A portable electronic device as claimed in claim 15 wherein the virtual image display is mounted within a heads-up display as part of a head-mount unit, the head-mount unit further including an earpiece speaker and a microphone.

22. A portable electronic device comprising:
   a smart card interface including a sensor structure mounted in a portable housing and constructed to have a smart card having data stored thereon positioned adjacent thereto in data sensing juxtaposition, the sensor structure including an input terminal for receiving transmitted data thereon and an output terminal having sensed data thereon;
   a virtual image display mounted in a remote unit positioned to provide an image for viewing at a viewing aperture, the virtual image display including a data input terminal designed to receive image data thereon, the virtual image display further including a two dimensional array of light emitting devices connected to provide a complete image, the two dimensional array being coupled to the data input terminal of the virtual image display for receiving the image data and generating the image in response thereto;
   a two-way voice cellular communications transceiver mounted in the portable housing and including an input terminal for receiving data from the sensor structure and an output terminal having data transmitted from a host database thereon; and
   electronics mounted in the portable housing and connected to the input terminal of the sensor structure for receiving the transmitted data from the host database and the output terminal of the sensor structure for receiving the sensed data from the smart card and further connected to the input terminal of the virtual image display for supplying image data thereto.

23. A portable electronic device as claimed in claim 22 wherein the remote unit is a head-mount unit.

24. A portable electronic device as claimed in claim 23 wherein the head-mount unit includes a microphone and an earpiece speaker.

25. A portable electronic device as claimed in claim 22 wherein the remote unit includes one of wired, wireless, radio frequency and infra-red communication capabilities with the electronics of the portable electronic device.

26. A portable electronic device comprising:
   a portable housing;
   a virtual image display positioned to provide an image for viewing at a viewing aperture, the virtual image display including a data input terminal designed to receive image data thereon, the virtual image display further including a plurality of optical elements having a light inlet and a light outlet directed at an angle to the light inlet, with a reflecting surface optically positioned between the light inlet and the light outlet so as to direct light from the light inlet to the light outlet, the plurality of optical elements include at least one aspheric surface for aberration correction, the plurality of optical elements defining a light path from the light inlet to the light outlet with a total average optical length in a range of approximately 20 to 35 millimeters, and at least one diffractive optical element positioned in the light path so as to provide further aberration correction, and the plurality of optical elements being constructed to angularly magnify an image source at the light inlet of a first optical element by greater than ten;

a sensor structure mounted in the portable housing and constructed to have a smart card having data stored thereon positioned adjacent thereto in data sensing juxtaposition, the sensor structure including an output terminal having sensed data thereon and an input terminal having transmitted data thereon;

electronics mounted in the portable housing and connected to the input terminal and output terminal of the sensor structure for receiving, processing and transmitting data between a host database and the smart card and further connected to the input terminal of the virtual image display for supplying image data thereto; and a cellular transceiver mounted in the portable housing and connected to the electronics for receiving and transmitting data between the electronics of the portable electronic device and the host database.

27. A portable electronic device as claimed in claim 26 wherein the virtual image display includes a two dimensional array of light emitting devices connected to provide a complete image, the two dimensional array being coupled to the input terminal of the virtual image display for receiving the image data and generating the image in response thereto.

28. A portable electronic device as claimed in claim 27 wherein the two dimensional array of light emitting devices includes a two dimensional array of light emitting diodes.

29. A portable electronic device as claimed in claim 27 wherein the two dimensional array of light emitting devices includes a two dimensional array of organic light emitting diodes.

30. A portable electronic device as claimed in claim 26 wherein the virtual image display is mounted within the portable housing.

31. A portable electronic device as claimed in claim 26 wherein the virtual image display is mounted within a heads-up display as part of a head-mount unit, the head-mount unit further including an earpiece speaker and a microphone.

32. A portable electronic device as claimed in claim 26 wherein the electronics includes a central processing unit (CPU) and a random access memory (RAM).

* * * * *